(12) United States Patent
Scarpitti et al.

(10) Patent No.: US 6,443,199 B1
(45) Date of Patent: Sep. 3, 2002

(54) FOOTPRINTS FOR NONROTATABLE AUTOMOBILE AND LIGHT TRUCK TIRES

(75) Inventors: Anthony John Scarpitti, Uniontown; Michael Alois Kolowski, Mogadore; Frederick William Miller, Akron; Donald Woodrow Gilliam, Uniontown; Keith Carl Trares, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/463,834

(22) PCT Filed: Sep. 17, 1998

(86) PCT No.: PCT/US97/17108

§ 371 (c)(1),
(2), (4) Date: Jan. 24, 2000

(87) PCT Pub. No.: WO99/14065

PCT Pub. Date: Mar. 25, 1999

(51) Int. Cl.$^7$ .......................... B60C 11/00; B60C 119/00
(52) U.S. Cl. .............................. 152/209.1; 152/209.26; 152/904
(58) Field of Search .................... 152/209.1, 209.14, 152/454, 209.26, 904

(56) References Cited

U.S. PATENT DOCUMENTS

| | | | |
|---|---|---|---|
| 3,693,687 A | 9/1972 | Hannover et al. | .......... 152/209 |
| 4,807,679 A | 2/1989 | Collette et al. | .......... 152/209 R |
| D302,960 S | 8/1989 | Himuro et al. | ............ D12/146 |
| D303,513 S | 9/1989 | Collette et al. | ............ D12/147 |
| 4,930,559 A | * 6/1990 | Takehara et al. | |
| 5,042,546 A | * 8/1991 | Fornex et al. | |

(List continued on next page.)

FOREIGN PATENT DOCUMENTS

| | | | | |
|---|---|---|---|---|
| DE | 14 80 962 A | | 6/1969 | |
| DE | 39 01 624 A | | 8/1989 | ........... B60C/11/03 |
| DE | 19545322 | * | 6/1996 | |
| EP | 323519 | * | 7/1989 | |
| EP | 0502684 A | | 9/1992 | ........... B60C/19/00 |
| EP | 710577 | * | 5/1996 | |
| JP | 5-229308 | * | 9/1993 | |

OTHER PUBLICATIONS

VDI Berichte 778 [VDI Report 788], by Verein Deutscher Ingenieure (Union of German Engineers), published Sep. 1989, Hannover Germany, pp 179, 189 (with English translation of p. 189) translation for German 1480962.*

Database WPI, Section Ch, Week 9639, Derwent Publications Ltd., London, GB; Class A95, AN 96–388085 XP002065135 & JP 08 188 015 A (Bridgestone Corp), Jul. 23, 1996.

*Primary Examiner*—Steven D. Maki
(74) *Attorney, Agent, or Firm*—David L. King (57) ABSTRACT

A pneumatic radial tire combination for four-wheeled automobile or light truck vehicles. The tire combination has a pair of front steer position tires and a pair of rear position tires. The front steer position tire has a footprint when the tire is normally inflated for normal load that has a footprint shape factor of greater than 1.00 at a 50% load, and about 1.00 at both 85% load and 100% load, the footprint shape factor being defined as the maximum circumferential extent of the tire's footprint at the centerplane of the tire's footprint width divided by the average of the circumferential extent of the tire's footprint width as measured at 40% of the footprint from both sides of the central plane of the footprint. The rear position tire footprint, when the tire is normally inflated for normal load, has a footprint shape factor of about 1.00 at 50% load, and 1.00 or less than 1.00 at 85% load and 100% load when measured similar to the method described for the front position tires.

3 Claims, 7 Drawing Sheets

U.S. PATENT DOCUMENTS

| | | |
|---|---|---|
| D322,236 S | 12/1991 | Maxwell et al. .............. D12/141 |
| D336,066 S | 6/1993 | Guspodin ................... D12/141 |
| D342,705 S | 12/1993 | Graas ........................ D12/141 |
| 5,287,905 A | 2/1994 | Caretta et al. ........... 152/209 R |
| 5,323,824 A | 6/1994 | Swift et al. .............. 152/209 A |
| D350,507 S | 9/1994 | Helluin ....................... D12/141 |
| 5,415,215 A | 5/1995 | Covert et al. ............ 152/209 A |
| 5,658,404 A | 8/1997 | Brown et al. ............ 152/209 A |
| 5,733,393 A * | 3/1998 | Hubbell et al. |
| 5,803,998 A * | 9/1998 | Ohsawa et al. |

* cited by examiner

FOOTPRINTS FOR NONROTATABLE AUTOMOBILE AND LIGHT TRUCK TIRES

TECHNICAL FIELD

This invention relates to automobile and light truck tire combinations designed specifically for either the front wheel position or rear wheel position of front engine four wheeled mounted vehicles.

BACKGROUND ART

Automobile and light truck vehicles that have front engines and front steering suspensions have a vehicle weight distribution that is heavily loaded on the front position tires and lightly loaded on the rear position tires.

Light truck tires are routinely driven with no weight in the bed of the vehicle causing the rear tire position to typically operate at 50% of the tires rated load. When the truck is carrying weight the load can be increased up to 100% of the tires rated load on the rear tires.

Mini-vans and sport utility vehicles in addition to being weight distribution sensitive have higher centers of gravity than automobiles.

These multi purpose vehicles (MPV) put greater demands on tires due to their higher center of gravity and non-uniform weight distribution. This combination causes the vehicle to undergo greater amounts of vehicle roll putting higher loads on the outside shoulders of the front tires with nesulting increases in wear rates. Goodyear developed the Wrangler GS-A and Wrangler Aquatred to meet these demands by engineering a tread design with distinct tread zones for specific performance demands. The outside shoulder was solidified to resist the tendency for fast front tire shoulder wear while providing traction through tread blocks in the other zones of the tread. This design approach provided an inproved level of tread-wear and traction for MPV's in all wheel positions.

Figure 1:
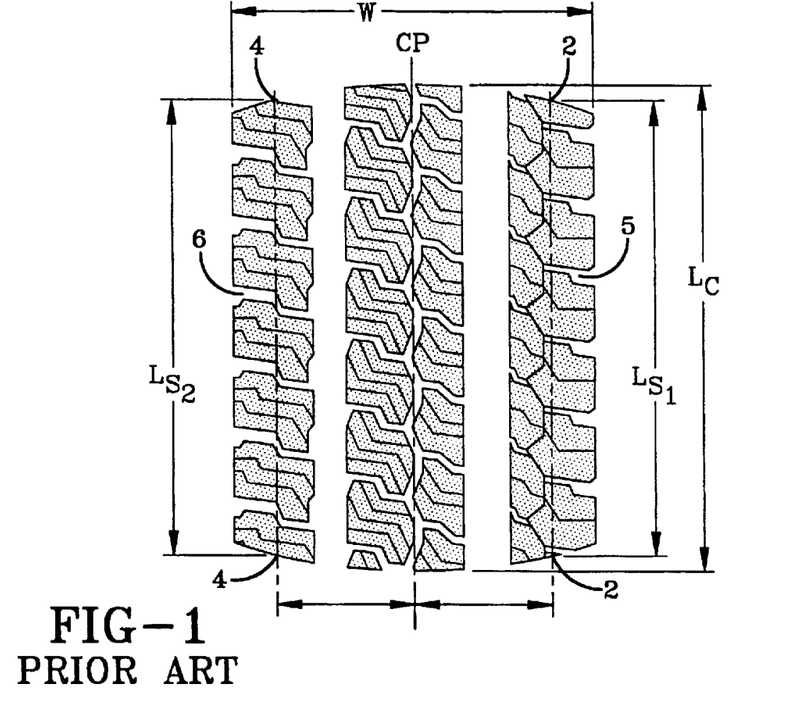
FIG. 1 is a plan view of a footprint of a prior art tire made according to U.S. Pat. No. 5,415,215, the tire being normally inflated and loaded representing a front steer position mounting on a light truck or automobile.

Tires for the front wheel positions of MPV's are subjected to special demands because of the higher center of gravity of the vehicle and the greater tendency for the vehicle to roll onto the outside shoulders of the tire. Looldng at the footprint patch of the prior art tire in the front right wheel position (as depicted in FIG. 1) one notes the higher outside contact area of the shoulder 2. The tire geometry has been designed by increasing the trad mass distribution in this portion of the tread to rest the higher pressure and abrasion. The remainder of the tread area is optimized for traction and hydroplaning resistance. This state of the art design approach is embodied in the Wrangler GS-A and Wrangler Aquatred tires and represents the present state of the art in tread designs for MPV's.

Figure 2:
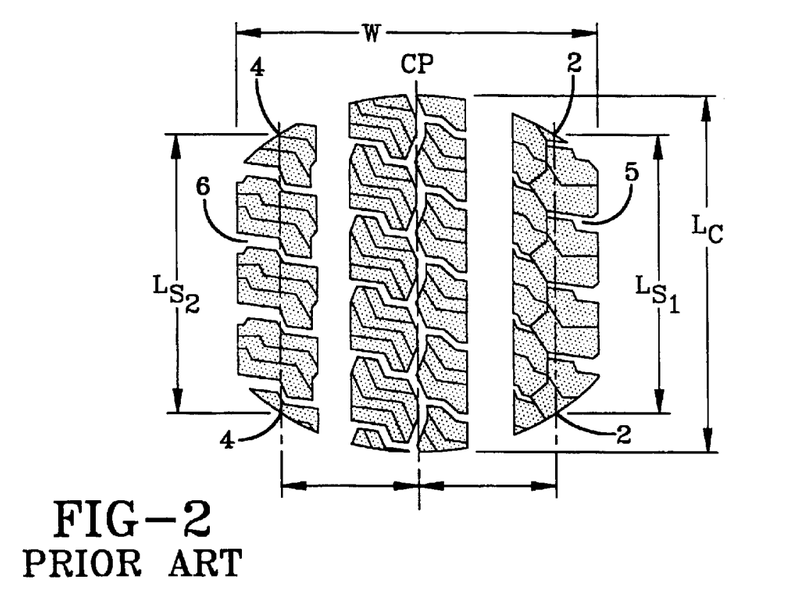
FIG. 2 is a plan view of a footprint of a prior art tire made according to FIG. 1 the tire inflated for a 100% load as in FIG. 1 but being loaded to 50% representing a lightly loaded rear position mounting on a light truck or automobile.

The rear wheel position of MPV's creates special demands on the tires because of the lighter and variable loading of the tire. The footprint of FIG. 2 depicts the same prior art tire of FIG. 1 when placed on the rear position at 50% load. At this position the centerline pressure of the footprint is highest and needs to resist abrasion. Larger tread elements are needed at the centerline to resist this higher abrasion tendency while still providing traction and hydro-planing restance by providing open shoulders a design that is in direct conflict with the needs of the front position tire.

The requirements for an all wheel position tire require a balance of design characteristics to meet the performance needs of both front and rear tire applications. Inevitably, certain design tradeoffs or balances must be made in order to achieve performance levels for both positions. This results in a balanced design that cannot be fully optimized for either position. The Wrangler GS-A and Wrangler Aquateed represents the state of the art approach in balanced performance while still meeting the special needs of the front tire positions on MPV's.

To push tire performance to the next level, new approaches to design and materials must be discovered. One attempt to push design towards the next level of tire performance for MPV's light trucks and automobiles focuses on optimizing the functional design based on wheel position requirements. The front tire requirements have been addressed by the prior art but were not fully exploited because of all wheel position demands. The demands of the rear position have been studied and understood but until recently have not been fully optimized due to the requirements for all wheel position capability. This invention focuses on optimizing both front and rear positions by designing a combination of tires having a unique tire for each position front and rear. The front tires can be more fully optimized to resist fast outside shoulder wear while providing outstanding wet traction and handling. The rear position can be more fully optimized to resist the fast centerline wear associated with rear wheel drive and light loads while providing high levels of driving traction.

To optimize the front tire position, the invention employs multiple tread radii contouring the tread to achieve improved tread pressure distribution. Additionally, tread pattern mass is adjusted to enhance anti-hydroplaning performance while still providing resistance to outside shoulder wear. Since front ties encounter water on the road first, they must be more capable of anti-hydroplaning performance than the rear ties that run in their trough or wake.

To optimize the rear ties position, the invention also employs multiple tread radii contouring the tread to achieve full contact of the tire footprint from shoulder to shoulder. This allows for more even tread-wear across the tread with secondary benefits of function improvement through full tread pattern contact. This has been previously difficult to achieve because of the light loading of the rear position and the use of all wheel position design balances resulting in high centerline pressure and wear. Additionally, the tread mass distribution can now be optimized to rest fast centerline abrasion with tread design pattern details specifically suited for rear wheel drive traction.

Optimizing both front and rear designs based on functional requirements can result in tires that require no rotation and perform to higher levels of performance than tires that are designed for all wheel position use.

While it has been known in the art that specific tires for a particular wheel position can improve performance by the selection of certain distinct tread patterns that are wheel specific as is taught in German patent DE 3901624A1. These concepts have been limited to exotic racing type vehicles or high performance vehicles which may even employee different sized tires.

The invention disclosed below employs not only a distinct tread mass distribution but also teaches a specific footprint shape factor at normal pressure for variable vehicle loading conditions which can be achieved by unique tread arc curvatures for the front position tires and the rear position tires.

DESCRIPTION OF THE INVENTION

SUMMARY OF THE INVENTION

A pneumatic radial tire combination for four-wheeled automobile or light truck vehicles has a pair of front steer position tires and a pair of rear position tires. Each front steer position tire or rear position tire has a footprint, each footprint has an axial width W, as measured at the lateral extremes of the footprint, a centerplane CP midway between the lateral extremes of the footprint.

The tire combination has a pair of front steer position tires and a pair of rear position tires. The front steer position tire has a footprint when the tire is normally inflated for normal load that has a footprint shape factor of greater than 1.00 at a 50% load, and about 1.00 at both 85% load and 100% load. The footprint shape factor is defined as the maximum circumferential extent of the tire's footprint at the centerplane of the tire's footprint width divided by the average of the circumferential extent of the tire's footprint width as measured at 40% of the footprint from both sides of the central plane of the footprint.

The rear position fire footprint, when the tire is normally inflated for normal load, has a footprint shape factor of about 1.00 at 50% load, and 1.00 or less than 1.00 at 85% load and 100% load when measured similar to the method described for the front position tires.

The footprints of each tire is divided into a central region, and a first shoulder and a second shoulder region. Me central region extends 20% of the footprint width W on either side of the centerplane CP. Each first and second shoulder region extends from a lateral edge of the footprint to the central portion. The tire combination has the footprint of the steer position tires having a tread contact area at normal inflation and load wherein the central region contact area is less than the contact area of a first or second shoulder area, while the footprint of the rear position tires have a contact area at normal inflation and load in the central region greater than the first or second shoulder portions.

Preferably, the central portion tread contact area of the front steer position tires is less than the first shoulder and the second shoulder contact areas respectively and the central portion of the tread contact area of the rear position tires is greater than the first and the second shoulder contact areas.

In a preferred embodiment, the central portion of the front steer position tires has a wide circumferential groove having a groove width of about 10% of the footprint width W at normal load and inflation while the rear position tire has two wide circumferential grooves, one wide groove being located between the contact area of the central portion and the contact area of each first and second shoulder area.

The inventive pneumatic radial tire combination for four-wheeled automobile or light truck vehicles has a pair of front steer position tires and a pair of rear position tires each tire having an axis of rotation and a casing. The casing has a carcass and a belt reinforcement radially outward of the carcass. A tread is radially outward of the belt structure of the casing. The tread has a pair of lateral edges, a tread arc extending between the lateral edges and a centerplane passing midway between the lateral edges and perpendicular to the axis of rotation.

The tire combination has a first tread arc for the front position teres and a second tread arc for the rear position tires, the tread arcs defined by a radially outer surface of the treads when the tires are normally inflated but unloaded.

The first tread arc has a curvature of maximum radius at the centerplane of the tire and a curvature of deceasing radius extending toward the lateral edges, at an intersection of the lateral edge and the tread arc a straight line drawn between the intersection of the tread arc curvature and the centerplane is inclined at an angle $\theta_F$ of greater than 5° relative to a tangent line L, L being tangent to the trad arc at the centerplane and parallel to the axis of rotation.

The second tread arc has a curvature of maximum radius at the centerplane of the tire and when measured similar to the tires for the front position has an angle $\theta_R$ of less than 5° relative to the tangent line L, L being tangent to the second tread arc curvature at the centerplane and parallel to the axis of rotation.

In the preferred tire combination, the front tire position first tread arc cube extending from the centerplane to a lateral edge has at least three radii of curvature $R_1$, $R_2$, $R_3$ decreasing in size as the curvature extends from the centerplane to each lateral edge and the rear tire position second tread arc of curvature has at least two radii $R_1$, $R_2$ of curvature decreasing in size as the curvature extends from the centerplane to each lateral edge.

The front tire position radius $R_1$, is the radius of curvature at the centerplane and $R_3$ is the radius of curvature at the lateral edge. Most preferably $R_1$ is greater than twice $R_3$. $R_1$ of the front tire position is preferably about 600 mm and the tread radius $R_3$ is greater than 200 mm.

The radii of curvature $R_1$, $R_2$, $R_3$ of the front position ties have the following ratio of lateral width to arc width on at least one-half of the tread of less than 50% for $R_1$, and greater than 20% for $R_2$ and $R_3$ respectively.

The rear tire position is radius $R_1$ preferably greater than 800 mm and the radius of curvature $R_2$ of the rear position tire is less than 200 mm.

The radii of curvature $R_1$ and $R_2$ of the rear position tires have the following ratio of lateral width to arc width on at least one tread-half of greater than 50% for $R_1$ and between 30% to 50% for $R_2$.

Definitions

"Aspect ratio" of the tire means the ratio of its section height (SH) to its section width (SW) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)" means the plane passing midway between the width of the tread and perpendicular to the tire's axis of rotation.

"Groove" means an elongated void area in a tread that may extend circumferentlally or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves that they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib or a block element.

DETAILED DESCRIPTION OF THE INVENTION

With reference to FIGS. 1 and 2 a prior art tire's footprint or contact patch is shown. The tire shown is the Goodyear Wrangler Aquatred has tread and features disclosed in U.S. Pat. Nos. 5,415,215 and 5,658,404. The tire footprints were taken at a constant inflation pressure of 35 psi (240 KPa) which is the inflation at 100% standard maximum or maximum load for the tire shown, a P235/75R15 as specified in the Tire & Rim Association Handbook. For comparative purposes each test tire 10, 20 and the prior art tire used this size tire.

After the tire is broken in using the ASTM break-in procedure for the tire the footprint shape can be determined.

To measure the footprint shape a tire is either inked and pressed against a paper or cardboard sheet which is laid on a flat hard surface at a fixed load and with the tire inflated at a fixed pressure leaving the impression of the tread on the paper or cardboard surface. This technique of footprinting is old in the tire art and is commonly understood. Alternatively, inkless procedures are also available which include carbonless paper, pressure sensing pads and the like. In all cases, one of the objectives is to get the tread contacting surfaces within the footprint defined.

Once the tire engineer has the footprint shape he or she can make several observations or predictions about the tire and its tread.

Historically, the butterfly shaped footprint was determined to be undesirable. Alternatively, the footprints having a shape similar to the bow of a boat were considered desirable for pushing water away from the center of the tread. As shown in FIGS. 1 and 2 the prior art tire exhibits this bow shape of footprint.

Inherently, when the leading and trailing edges of the footprint are not axially extending, that is if they are curved or bowed, this means that as the tire rolls a portion of the tread contacts the ground first and laterally adjacent tread elements follow. This can cause a phenomena known as tread element squirm. As the tread elements leave the treads footprint the elements snap out of the contact patch as the pressure holding the element against the road is released. The elements lightly contacting the road are slid across the roadway wearing the element similar to sliding rubber eraser across a sheet of paper. The inventors of the present invention believe ideally the tread elements should have a uniform pressure distribution laterally across the tread and more preferably the leading and trailing edges of the footprint should be axially extending in a straight line path under all operating conditions.

To better understand this ideal relationship, the inventors have developed a concept and methodology to define the footprint shape factor.

First, the maximum axial width W of the footprint is measured. Then, the distance halfway between the maximum axial width W is defined as the tire's centerplane CP. A distance 40% of the tread width (W) on each side of the centerplane is located as shown as reference numerals 2, 4. A circumferential line 5, 6 is drawn through points 2—2 and 4—4 respectively and the length of line $Ls_1$ and $Ls_2$ is calculated, summed and divided by 2 to arrive at an average shoulder length A. The footprint length $L_C$ at the centerplane is meased. The footprint shape factor F is the ratio of $L_C/L_S$.

As shown the footprint shape factor F of the prior art tire was 1.12 at normal inflation and normal load, at the same pressure and at 50% load the footprint shape factor F is 1.50. As can be easily appreciated the footprint's shape is very different at these different loads.

This prior art tire employed a large single radius of curvature $R_1$ and attempted to optimize the tread mass distribution for a "balanced tire" with very good wear characteristics. Nevertheless, the prior art tire had to be rotated after a period of use to optimize the tread wear rates. The problem is that these tires for light weight trucks face such a wide range of loads particularly on the rear position tires.

One partial solution to this variable load problem would be to reduce or increase the tire's inflation pressure to match each load condition. A central inflation system could be mounted on the vehicle which could automatically adjust the tire pressure to match the load. In such a case the footprint shape would most likely remain almost constant. The drawback to such a system is cost. The consumer would appreciate receiving this neutralizing of load variances at no cost. To achieve this result the tires must become somewhat load insensitive.

Figure 3A:
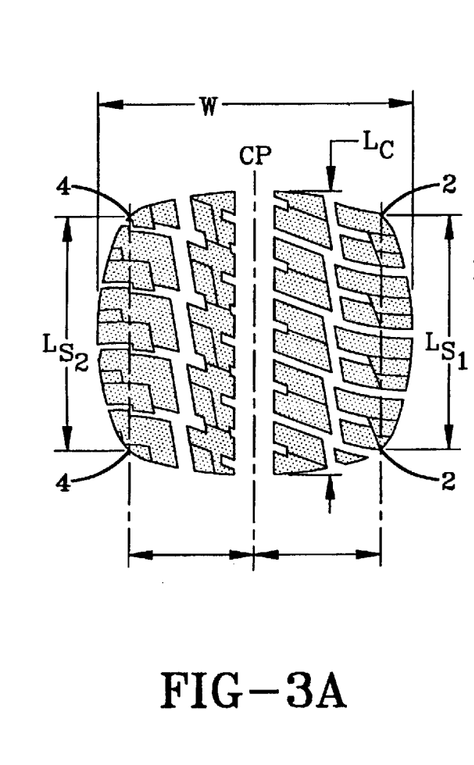
FIGS. 3A, 3B and 3C are plan views of the footprints of the front steer position inventive tire, depicting the tire inflated to the 100% load but loaded to 50%, 85% and 100% loads resectively.
Figure 3B:
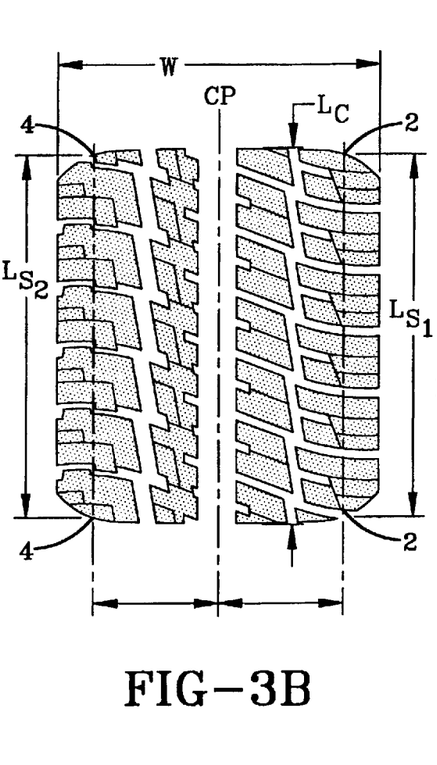
Figure 3C:
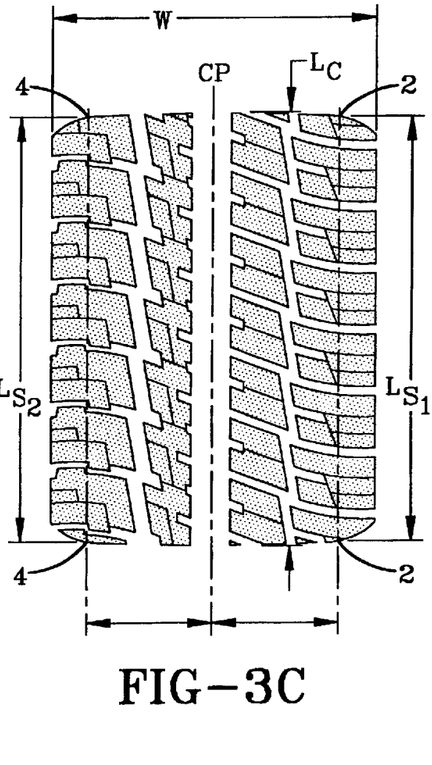
Figure 4A:
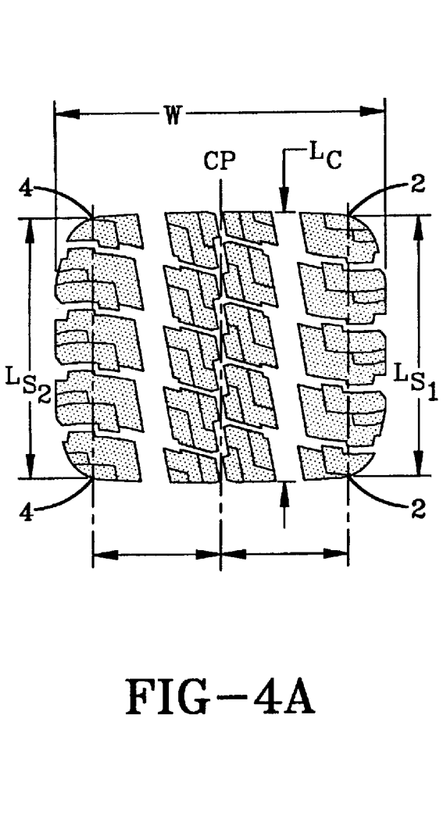
FIGS. 4A, 4B, and 4C are plan views of the footprints of the inventive tear position tire, depicting the tire inflated to 100% load but loaded to 50%, 85% and 100% loads respectively.
Figure 4B:
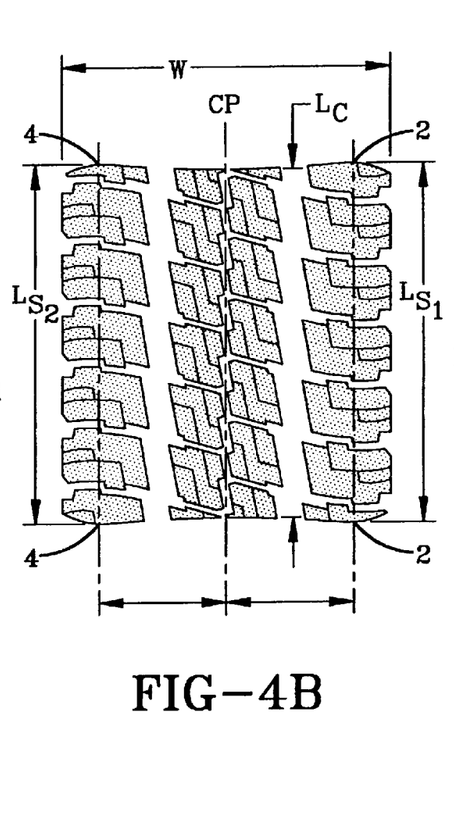
Figure 4C:
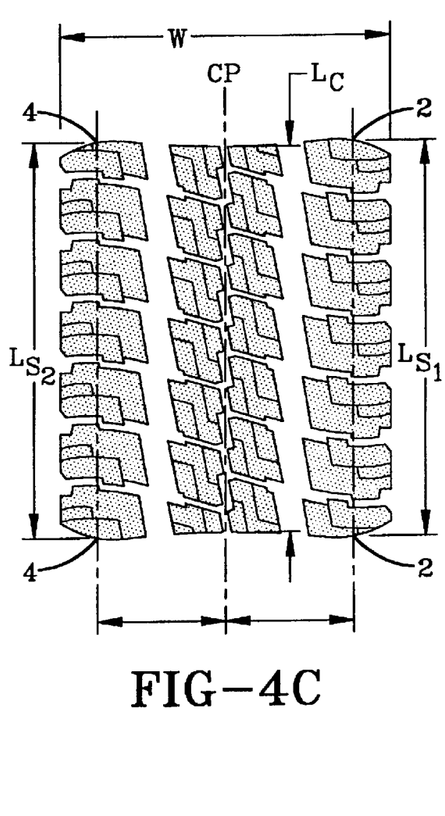

FIGS. 3A, 3B and 3C show footprints of a tire 10 for a front steer position four-wheeled vehicle. FIGS. 4A, 4B and 4C show footprints for a tire 20 for a rear position four-wheeled vehicle. In the figures each tire is inflated to a constant pressure and then the tire is broken in using ASTM tire bleak-in procedures. The inflated tire is then loaded to 50%, 85%, and 100% loads and a footprint is taken at each load. The footprint shape factor F is then calculated as previously described.

Ideally the length $Ls_2$ of the left side of the tire footprint is very close to the same length $Ls_1$ as the right side, that is the distance between the points 2—2 and the distance between points 4—4 are about the same. Since one of the objectives is to have the leading and trailing edges being almost axially extending at or during the most typical vehicle load condition for each wheel position it is considered important that the difference in length from point 2—2 relative to point 4—4 does not exceed 10%, more preferably about 5% or less. This means that the left side 2—2 could be greater in length than the length $L_C$ while the right side is smaller than $L_C$ with the resultant effect being $L_C/L_S$ equaling 1.00 however, in such a case the distance 2—2 would be 105% and the distance 4—4 would be 95% of the length $L_C$. This asymmetry of the footprint shape can be tolerated as long as the deviation from generally axially extending leading and trailing edges is minimized. The main feature is that the tires 10, 20 when exposed to the most common vehicle load for the wheel position, should have the footprint shape factor within 5 percent or less of the $L_C/L_S$ ratio of 1.0 most preferable within 2%. For example, given the front tire position achieves this result between 85% and 100% of vehicle load while the rear position tire sees this condition near the more typical 50% load condition.

The inventive front steer position tire 10 has a footprint shape factor greater than 1.00, at the 50% load, and about 1.00 at 85% load and about 1.00 at 100% load. In the particular embodiment tire 10 illustrated the footprint shape factor was 1.13, 0.99, and 0.98 respectively for the 50%, 85% and 100% loads.

In the rear position tire 20 the footprints shown in FIGS. 4A, 4B and 4C have footprint shape factors of about 1.00 at 50% load and 1.00 or less at both 85% load and 100% load. In the particular embodiment illustrated the footprint shape factors were 1.00, 0.91 and 0.90 for the 50%, 85% and 100% loads respectively when measured after being broken in. In the front steer position tires 10 the expected vehicle loads on the tire are typically in the 85% to 100% standard maximum load range. The four-wheeled front engine mounted vehicles typically exhibit that much weight on the forward portion of the vehicle. Therefore, the footprint shape factor F can very closely be designed to the ideal 1.00 give or take a few percent for the 85% and 100% load. In the exemplary tire 10 this was achieved when the 50% loaded tire 10 had a broken in footprint shape factor F set greater than 1.00, preferably about 10% greater.

In the rear position tire 20 the vehicle load range varies from the 50% load typically to 100% less frequently. Therefore, the tire 20 has the footprint shape factor set at about 1.00 for 50% load and less than 1.00 for the 85% and 100% loaded conditions. The initial 50% loaded footprint shape factor preferably is less than 1.05 with about a 0.10 drop from the initial 50% loaded condition as the loads increase to 85% and 100%.

It can be observed that a similar 0.10 or more drop occurred in the front position tire 10 as the loads increased from 50% to 85% and 100%. The difference being at the 50% loads the front tire footprint shape factor is about 0.10 or more greater than the rear position tire at the inflation pressures as tested.

Figure 5:
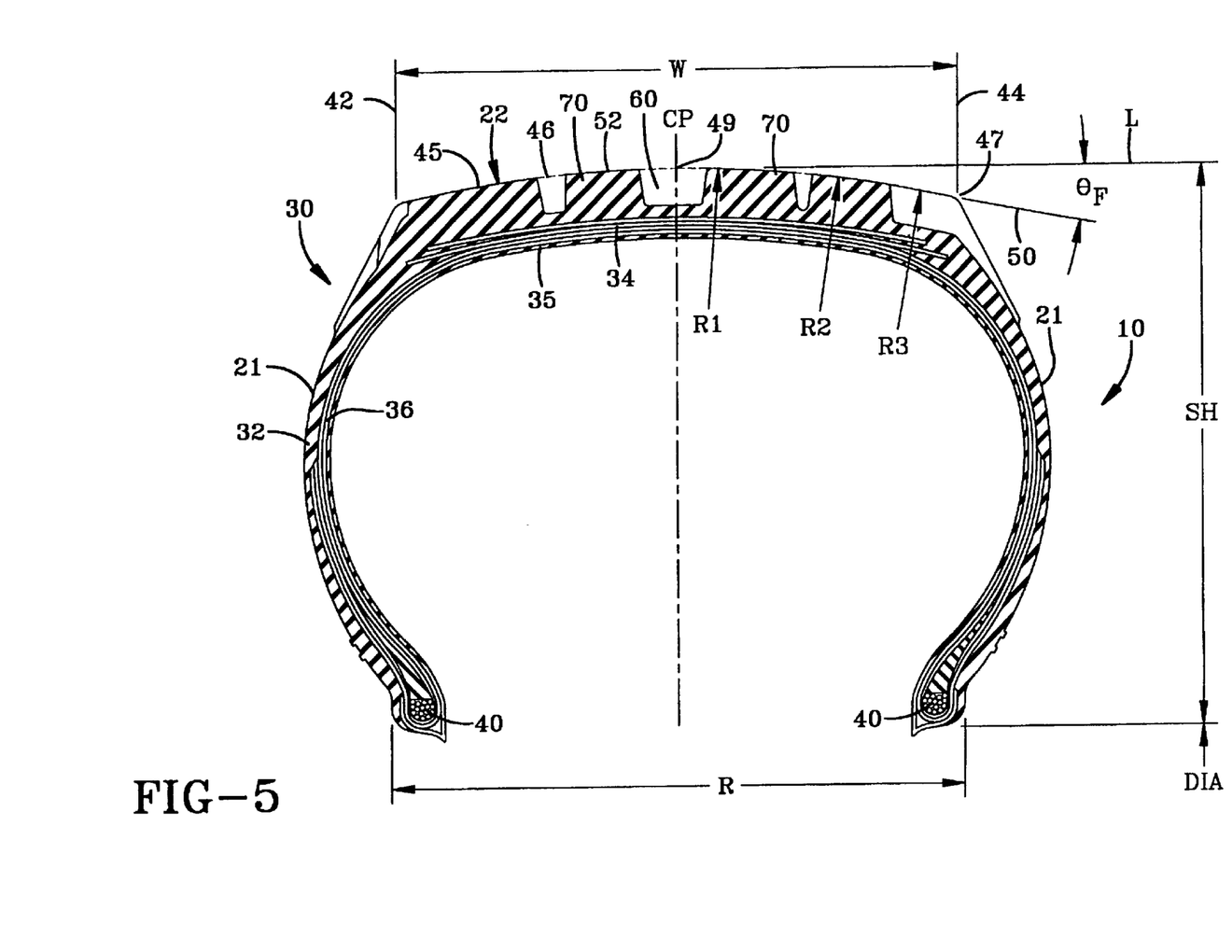
FIGS. 5 and 6 are cross-sectional views of the preferable embodiments inventive front steer position tire and the rear position tire respectively.
Figure 6:
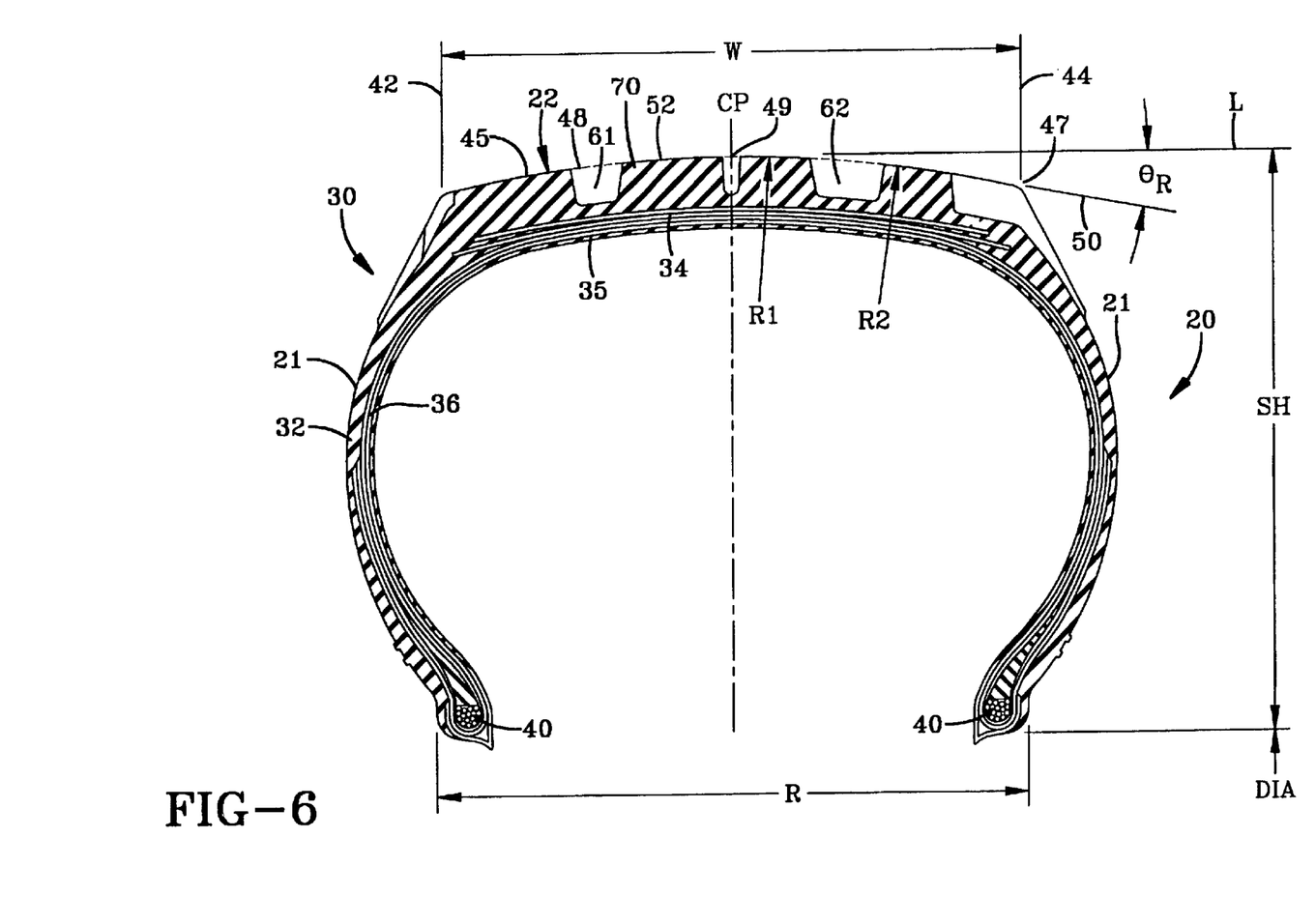

Having described the novel footprint shape factors needed to produce a combination of tires for a four-wheel front engine mounted vehicle that are specifically designed for the front steer wheel position and the rear wheel position the readers attention is called to FIGS. 5 and 6. FIG. 5 shows the cross section of the tire 10 for the front steer position whereas FIG. 6 shows the cross section of the tire 20 for the rear position.

As shown the tires 10 and 20 have very similar structures and are made of similar components. Alternatively, the tires may employ different tread compounds and other component differences more suited for the specific wheel position if so desired.

Each tire 10, 20 has an axis of rotation R, a casing 30, the casing 30 has a carcass 32 and a belt reinforcing structure 34 radially outward of the carcass 32. The carcass 32 preferably includes at least one elastomeric ply 36 reinforced with radial cords and an inner liner 35 and a pair of sidewalls 21. The ply 36 is wrapped about two annular bead cores 40 as shown. The tires 10, 20 each have tread 22 located radially outward of the belt reinforcing structure 34 of the casing 30. The tread has a pair of lateral edges 42, 44, a tread arc 46, 48 extending between the lateral edges and a centerplane (CP) passing midway between the lateral edges 42, 44 and perpendicular to the axis of rotation. The combination of tires 10, 20 exhibit two distinct tread arcs 46 for the front tire 10 and 48 for the rear tire 20. The first tread arc 46 for the front position tire 10 and the second tread arc 48 of the rear tire 20 are both defined by the radially outermost surface 52 of the tread elements when the tire is inflated but unloaded.

The first tread arc 46 has a curvature of maximum radius $R_1$ at the centerplane CP of the tire 10 and a curvature of decreasing radius AR, extending toward the lateral edges. As shown at an intersection 47 of the lateral edge and the tread arc a straight line 50 is drawn between the intersection 49 of the arc and the centerplane CP. The line 50 is inclined at an angle $\theta_F$ greater than 5° relative to a tangent line L, L being tangent to the trad arc at the centerline CP and parallel to the axis of rotation.

It is believed preferred that both tread halves extending from the centerplane CP to the lateral edges 42, 44 have similar curvatures, however, it is contemplate that the curvature could be asymmetric or distinct between tread halves but it is believed that the line 50 should be inclined at an angle $\theta_F$, $\theta_F$ being greater than 5° on either side.

What is a clearly unique feature is that the tire 20 for the rear position has a line 50 inclined at an angle $\theta_R$, $\theta_R$ being less than 5°.

For simplicity of measurement, these features can easily be measured directly from the tire mold or the engineering drawings. The rear tire 20 like the front tire 10 is preferably symmetrical on each tread half in terms of tread arc curvatures although the inventive concept is not limited to a symmetry of curvature.

The inventors believe that the above described curvatures of the tread arc provide one very good if not the best way of way achieving the footprint shape factors F.

In the front tire 10 the preferred tire had at least three radii of curvature $R_1$, $R_2$, $R_3$ extending from the centerplane to a lateral edge 42 or 44. The radii $R_1$, $R_2$, $R_3$ decrease in size as the curvature exteds from the centerplane to each lateral edge. $R_1$ is the radius of curvature at the centerplane, the radius $R_1$, extending laterally to less than 50% of the arc width while the radii $R_2$ and $R_3$ each have lateral width of greater than 20% of the arc width as measured between the centerplane CP and the lateral edges 42, 44 or on one-half of the tread as shown in FIG. 5.

The tire 10 of the present invention had the $R_1$ radius at least twice as large as $R_3$, preferably about three times and $R_1$ falling in between $R_1$, and $R_3$ in size and location. $R_1$ for the test tire 10 was about 600 mm, $R_2$ was about 300 mm, while $R_3$ is greater than 200 mm, about 229 mm. The lateral width ratio of $R_1$ was 45.2%, $R_2$ was 24% and $R_3$ was 30.8%. The actual total tread arc width being the sum of 38.12 mm for $R_1$, 20.22 mm for $R_2$ and 25.9 mm for $R_3$ or 84.24 mm for each half of the tread as shown in FIG. 5. The resulant shoulder drop at the intersection 47 relative to the line L is about 8 mm and the angle $\theta_F$ was 5.4°.

For the preferred rear tire 20 the tread arc curvature 46 had two radii, $R_1$ and $R_2$, R1 being greater than 800, or about 834 mm while $R_2$ was less than 200 mm, or about 175 mm. The lateral width ratios of the curvatures $R_1$ and $R_2$ were greater than 50% for $R_1$ and between 30% to 50% for $R_2$. The actual test tire $R_1$ width to arc width ratio was 61.8% while $R_2$ was 38.2% on each tread half. The actwal widths 53.64 mm and 33.2 mm on each tread half for a total tread arc width per tread half of 88.84 mm. The tread shoulder drop off at the intersection 47 was about 7 mm. While $\theta_R$ was less the 5°, measuring 4.6°.

For comparison the prior art Wrangler Aquated had a single tread radius $R_1$ of about 433 mm and a tread width ratio of 100% with a total tread arc width of about 80 mm per tread half. The resultant angle $\theta$ was 5.3°. What this meant was that the prior art tire was aruably closer to satisfying the angular relationship for the front steer position, however, when one studies the footprint shape factor F as shown in FIGS. 1 and 2, a bow shaped footprint outside the desired range is exhibited. This to the inventors means that the prior art tire although a good "balanced tire" failed to optimize the features needed for the combination of unique steer and rear position applications.

Having established the basis for distinct optimize footprint shape fators F and unique tread arc curvatures for each wheel position the final problem solved by the inventors was the placement of and type and shape of the tread elements.

Figure 7:
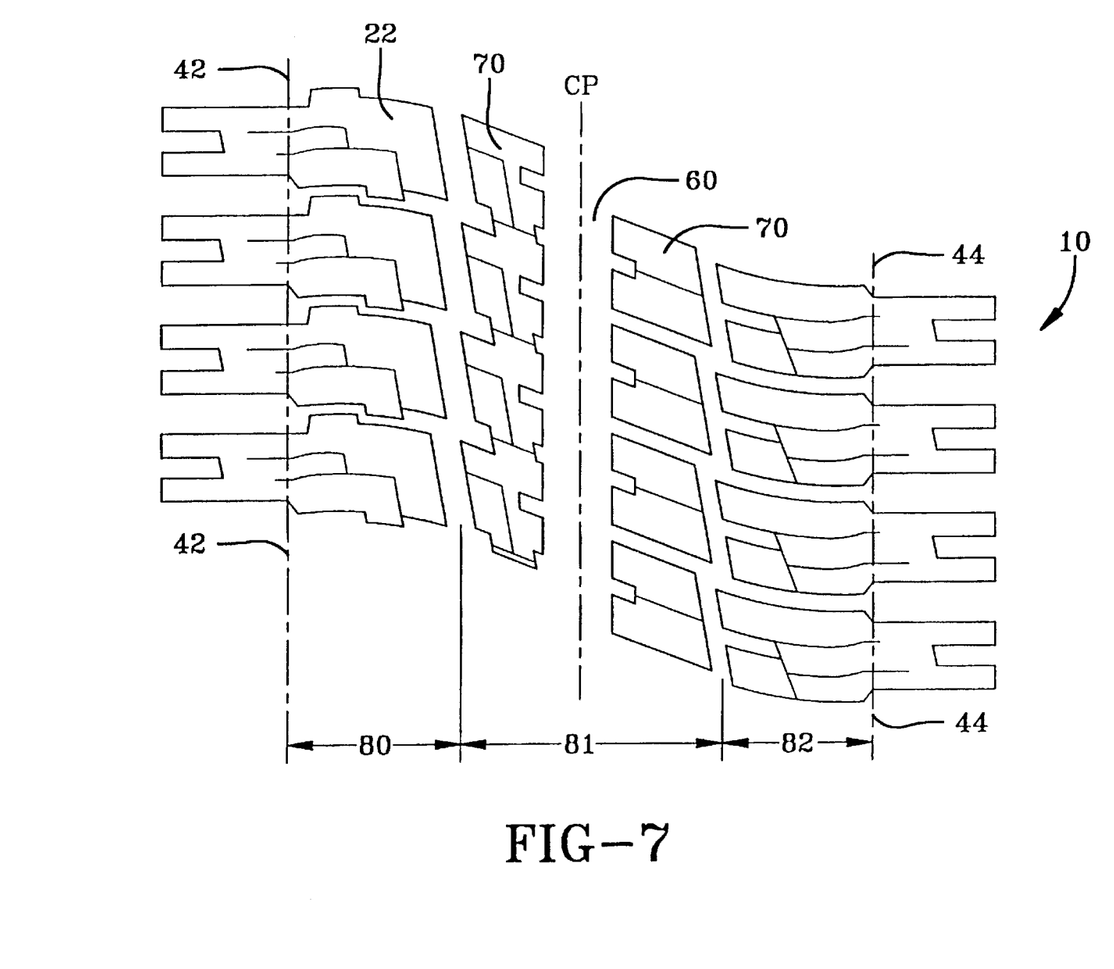
FIGS. 7 and 8 are plan views of portions of the preferred treads for the inventive front steer position tire and the rear position tire respectively.
Figure 8:
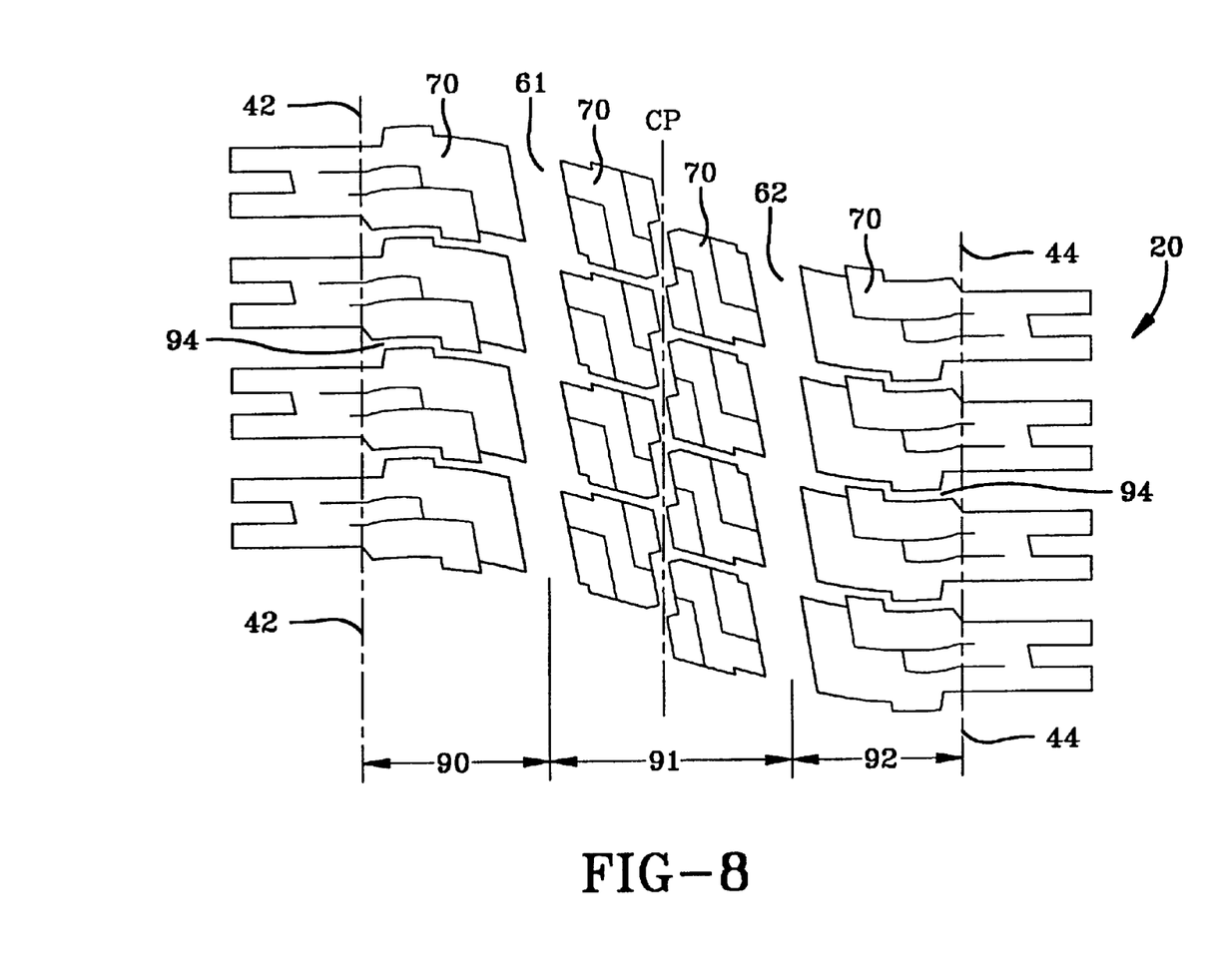

Since a specific tire was need for each wheel position the inventors have the freedom to select distinct front and rear position tread patterns. In FIGS. 7 and 8 are plan views of the preferred tread patterns.

In tire 10 the tread 22 has a wide circumferential groove 60 in the center of the tread bounded by closely spaced tread elements 70 adjacent the wide groove. If the tread were divided into three equal width zones 80, 81, 82 between the lateral edges 42, 44. The central zone 81 would have a net contact area less than either shoulder zone 80 or 82. While the zone 80 should be equal to or greater in net contact area than the other shoulder zone 82.

The rear tire 20 tread as shown in FIG. 8 has two wide circumferential groves, one such groove 61, 62 being bounded by tread elements 70 and being located with each half of the tread and being spaced laterally about midway of each head half. The central zone 91 has a net contact area greater than the net contact area of shoulder zones 90 and 92.

The shoulder zones 90, 92 have net contact areas about equal as shown with open laterally extending grooves 94 for traction. This combination of tread patterns optimizes the tread wear rates for each wheel position while enhancing snow and wet traction performance.

The front tire 10 has a tread arc width slightly narrower than the rear tire 20. This complements the use of only one wide circumferential groove 60 on the front tire. While the wider rear tire employs two such grooves 61, 62, this combination has very pronounced deep-water anti-hydroplaning benefits. The narrower front tire pushes the water out of the way the wider rear tires following in the wake of the front tire sees less water in the center of the tread and a little more in the shoulders zones when traveling at speed. This is a phenomena that is likely to result when a driver suddenly comes upon deep puddle water on a roadway and unexpectedly has no time to reduce speed. These tires greatly enhance the vehicle's ability to track straight without hydroplaning.

It is believed beneficial if the wide groove, 60, 61, 62 leave a width of at least 7% of the total tread width, preferably about 10%.

As can be seen from the above description, the inventive front tire 10 is dissimilar to the rear position tire 20 is a multiple of ways. The footprint shape factors, the tread arc curvatures and the tread mass distribution are distinct. These differences due to wheel position sensitivity are noticeable. In commercial tires for heavy-duty trucks specific tires for the various wheel positions is common practice. In the lightweight vehicles such a practice was heretofore avoided. By discovering a way in which vehicle tire rotation is not needed to achieve acceptable tread wear, the present invention greatly enhances the agencies ability to tune the tire for optimal performance.

One such way is to provide a harder better wearing tread compound on the front wheel position and a softer more traction sensitive compound on the rear tire. Similarly a lower rolling resistant compound can be used on the front wheel position while a superior traction compound is used on the rear. By tuning the tires such a way, the performance of the combination will be superior to the performance of the balanced or all position tires of the past.

What is claimed is:

1. A pneumatic radial tire combination for four-wheeled automobile or light truck vehicles having a pair of front steer position tires and a pair of rear position tires, each front steer position tire or rear position tire having a footprint, each footprint has an axial width W, as measured at the lateral edges of the footprint, a centerplane CP midway between the lateral edges of the footprint, and wherein the footprint of each tire is divided into a central region and a first shoulder region and a second shoulder region, the central region extending 20% of the footprint width W on either side of the centerplane CP, each first and second shoulder region extending from a lateral edge of the footprint to the central region, the tire combination being characterized by:

each front steer position tire having from the centerplane to a lateral edge at least three tread radii ($R_1$, $R_2$, $R_3$) decreasing in size as the curvature extends from the centerplane to each lateral edge and a footprint when the tire is normally inflated for normal load that has a footprint shape factor (F) of greater than 1.00 at a 50% load, and about 1.00 at both 85% load and 100% load, the footprint shape factor (F) being defined as the maximum circumferential extent ($L_C$) of the tire's footprint at the centerplane of the tire's footprint width divided by the average of the circumferential extent ($L_S$) of the tire's footprint width as measured at 40% of the footprint from both sides of the centerplane of the footprint, the footprint of the steer position tires having a tread contact area at normal inflation and load wherein the central region has a contact area less than the contact area of the first or second shoulder region;

each rear position tire having multiple tread radii ($R_1$, $R_2$) contouring with decreasing radii toward the lateral edges and a footprint when normally inflated for normal load that has a footprint shape factor (F) of about 1.00 at 50% load, and 1.00 or less than 1.00 at 85% load and 100%, the footprint of the rear position tires have a contact area at normal inflation and load in the central region greater than contact area of the first or second shoulder area region; and wherein the footprint shape factor (F) of the front steer position tires is about 0.10 or more greater than the footprint shape factor (F) of the rear position tire at the 50% load.

2. The tire combination of claim 1 wherein the central region of the front steer position tires has a wide circumferential groove having a groove width of about 10% of the footprint width W at normal load and inflation.

3. The tire combination of claim 1 wherein the rear position tire has two wide circumferential grooves, one wide groove being located between the contact area of the central region and the contact area of each first and second shoulder region.

* * * * *